(12) United States Patent
Maruno et al.

(10) Patent No.: US 11,697,180 B2
(45) Date of Patent: Jul. 11, 2023

(54) ALUMINUM ALLOY BRAZING SHEET

(71) Applicant: Mitsubishi Aluminum Co., Ltd., Minato-ku (JP)

(72) Inventors: Shun Maruno, Susono (JP); Michihide Yoshino, Susono (JP); Shohei Iwao, Susono (JP)

(73) Assignee: MA ALUMINUM CORPORATION, Minato-ku (JP)

( * ) Notice: Subject to any disclaimer, the term of this patent is extended or adjusted under 35 U.S.C. 154(b) by 163 days.

(21) Appl. No.: 17/274,283

(22) PCT Filed: Aug. 19, 2019

(86) PCT No.: PCT/JP2019/032250
§ 371 (c)(1),
(2) Date: Mar. 8, 2021

(87) PCT Pub. No.: WO2020/054325
PCT Pub. Date: Mar. 19, 2020

(65) Prior Publication Data
US 2021/0346992 A1  Nov. 11, 2021

(30) Foreign Application Priority Data
Sep. 11, 2018 (JP) ................................. 2018-169438

(51) Int. Cl.
B23K 35/28 (2006.01)
B23K 35/02 (2006.01)
C22C 21/00 (2006.01)
C22F 1/04 (2006.01)
F28F 21/08 (2006.01)
B23K 103/10 (2006.01)

(52) U.S. Cl.
CPC ........ *B23K 35/288* (2013.01); *B23K 35/0238* (2013.01); *C22C 21/00* (2013.01); *C22F 1/04* (2013.01); *F28F 21/084* (2013.01); *F28F 21/089* (2013.01); *B23K 2103/10* (2018.08); *Y10T 428/12764* (2015.01)

(58) Field of Classification Search
None
See application file for complete search history.

(56) References Cited

U.S. PATENT DOCUMENTS

| 2011/0240280 | A1* | 10/2011 | Izumi | ..................... C22C 21/00 165/185 |
| 2012/0279694 | A1 | 11/2012 | Kamiya et al. | |
| 2014/0158335 | A1* | 6/2014 | Kuroda | ................. F28F 21/089 148/528 |
| 2017/0304957 | A1* | 10/2017 | Yoshino | .................. F28F 19/06 |

FOREIGN PATENT DOCUMENTS

| CN | 103305724 A | 9/2013 |
| JP | 2000-309837 A | 11/2000 |
| JP | 2002126894 A | * 5/2002 |
| JP | 2003-293065 A | 10/2003 |
| JP | 2005-307251 A | 11/2005 |
| JP | 2008-188616 A | 8/2008 |
| JP | 2009-155673 A | 7/2009 |
| JP | 2010-255013 A | 11/2010 |
| JP | 2013-23748 A | 2/2013 |
| JP | 2014-54656 A | 3/2014 |
| JP | 2014-205876 A | 10/2014 |
| JP | 2014-210949 A | 11/2014 |
| JP | 2016-17222 A | 2/2016 |
| JP | 2016-98404 A | 5/2016 |
| JP | 2017-20108 A | 1/2017 |
| JP | 2017-145463 A | 8/2017 |
| JP | 2017-179528 A | 10/2017 |
| WO | WO 2011/034102 A1 | 3/2011 |

OTHER PUBLICATIONS

Combined Chinese Office Action and Search Report dated Aug. 25, 2021 in Patent Application No. 201980058827.9 (with partial English language translation), 9 pages.
International Search Report dated Nov. 19, 2019 in PCT/JP2019/032250 filed on Aug. 19, 2019, 2 pages.
Notice of Allowance dated Feb. 16, 2022 in Chinese Patent Application No. 201980058827.9 (with partial English language translation), 6 pages.

* cited by examiner

*Primary Examiner* — Seth Dumbris
(74) *Attorney, Agent, or Firm* — Oblon, McClelland, Maier & Neustadt, L.L.P.

(57) ABSTRACT

An aluminum alloy brazing sheet may include a sacrificial material having a function of a brazing material on at least one surface of a core material, wherein the sacrificial material has a composition containing: in a mass %, 2% to 5% of Si; 3% to 5% of Zn; and an Al balance with inevitable impurities the core material is made of an Al—Mn-based alloy, an in the core material before brazing, Al—Mn based secondary particles having an equivalent circle diameter of 100 to 400 nm are distributed with a number density of 0.3 to 5 particles/μm$^2$.

20 Claims, No Drawings

ALUMINUM ALLOY BRAZING SHEET

TECHNICAL FIELD

The present invention relates to an aluminum alloy brazing sheet including a sacrificial material having a function of a brazing material on at least one surface of a core material.

BACKGROUND ART

In recent years, there has been an increasing demand for a heat exchanger for a vehicle for cooling an engine or a fluid such as engine oil. In these heat exchangers, cooling is performed with water (+Long Life Coolant: LLC) which forms an environment where corrosion is likely to occur, and accordingly, high corrosion resistance is required on a cooling water flow path side.

In addition, it is necessary that the heat exchanger for a vehicle is joined to each of other members by brazing heat treatment, and accordingly, a brazing sheet consisting of a sacrificial material, a core material, and a brazing material is used in many cases for the purpose. However, the heat exchanger used for such purpose has various forms and may have a complicated structure, and accordingly, in a case where there is no brazing material layer or there is only one layer of the brazing material layer, there is a problem that the structure is limited. In addition, corrosion resistance may be required on the brazing side.

In recent years, an Al—Zn—Si alloy allowing a sacrificial material on one side to have a function of the brazing material is known (for example, see Patent Literature 1).

CITATION LIST

Patent Literature

[Patent Literature 1] Japanese Unexamined Patent Application, First Publication No. 2005-307251

SUMMARY OF INVENTION

Technical Problem

Meanwhile, in an Al—Zn—Si alloy which applies a function of the brazing material to the sacrificial material, a Si concentration in the Al—Zn—Si alloy is suppressed to a certain extent in order to maintain the effect of the sacrificial material, and accordingly, it is necessary to ensure corrosion resistance by primary crystals remaining after brazing. However, in the current stage, problems such as occurrence of intergranular corrosion, loss of primary crystal which is an anticorrosive layer, and the like occur due to a distribution state of an Al—Mn based secondary particles in the core material.

The present invention has been made against the background of the above circumstances, and an object of the present invention is to provide an aluminum alloy brazing sheet having excellent corrosion resistance and brazability.

Solution to Problem

In the present invention, by making the sacrificial material contain Si to play a role of a brazing material, it is possible to cope with a heat exchanger having a complicated structure and to ensure corrosion resistance on a cooling water side.

In addition, by controlling an equivalent circle diameter and a number density of dispersoids in a core material and controlling a precipitation site of free Si diffused from the sacrificial material to the core material, the Si precipitation on grain boundaries, formation of a Si-lacking layer near the grain boundaries, and intergranular corrosion are suppressed and the corrosion resistance is improved.

That is, in a first aspect, an aluminum alloy brazing sheet of the present invention is alloy brazing sheet comprising a sacrificial material having a function of a brazing material on at least one surface of a core material, wherein the sacrificial material has a composition containing: in a mass %, 2.0% to 5.0% of Si; 3.0% to 5.0% of Zn; and an Al balance with inevitable impurities the core material is made of an Al—Mn-based alloy, an in the core material before brazing, Al—Mn based secondary particles having an equivalent circle diameter of 100 to 400 nm are distributed with a number density of 0.3 to 5 particles/$\mu m^2$.

In the invention of another aspect of the aluminum alloy brazing sheet, a Mn/Si ratio is 0.5 to 5.0 in a region of 50 μm from the sacrificial material/core material interface after heat treatment equivalent to brazing in which a temperature raises to 590° C. to 615° C.

In the invention of another aspect of the aluminum alloy brazing sheet, the core material has a composition containing: in a mass %, 0.3% to 2.0% of Mn; 0.05% to 1.0% of Si; 0.01% to 1.0% of Cu; and 0.1% to 0.7% of Fe; an Al balance with inevitable impurities.

In the invention of another aspect of the aluminum alloy brazing sheet, the sacrificial material further contains one or more of: 0.1% to 1.0% of Mn; and 0.1% to 0.7% of Fe in terms of mass %.

In the invention of another aspect of the aluminum alloy brazing sheet, a pitting potential after brazing is less noble in an order of: a eutectic filler of sacrificial material, a primary filler of sacrificial material, and a sacrificial material/core material interface layer, and a potential difference between a most noble layer in the sacrificial material and a least noble layer in the core material is 50 to 200 mV.

The reasons for limiting the technical matters specified in the present invention will be described below. The contents of the components contained in the sacrificial material and the core material are shown in mass %.

[Sacrificial Material]

Si: 2.0% to 5.0% (preferably 2.5 to 4.0%)

Si is contained as an essential element, since it improves brazability. However, if a content thereof is extremely small, poor join occurs, and if the content is extremely large, erosion occurs and the corrosion resistance deteriorates. For these reasons, the Si content is defined in the range described above. For the same reasons, a lower limit of the Si content is desirably 2.5% and an upper limit thereof is desirably 4.0%.

Zn: 3.0% to 5.0% (preferably 3.0 to 4.0%)

Zn is contained as an essential element, since it improves the corrosion resistance. However, if a content thereof is extremely small, the corrosion resistance deteriorates, and if the content is extremely large, preferential corrosion of a fillet occurs. For these reasons, the Zn content is defined in the range described above. For the same reasons, a lower limit of the Zn content is desirably 3.0% and an upper limit thereof is desirably 4.0%.

Mn: 0.1% to 1.0% (preferably 0.2 to 0.8%)

Mn is contained as desired, since it improves a strength. However, if a content thereof is small, a desired effect cannot be obtained, and if the content is extremely large, a giant intermetallic compound is generated. For these reasons, in a case where Mn is contained, the Mn content is desirably in the range described above. For the same reasons, a lower limit of the Mn content is desirably 0.2% and an upper limit thereof is desirably 0.8%. Even in a case where Mn is not positively contained, Mn of 0.05% or less may be contained as an inevitable impurity.

Fe: 0.1% to 0.7% (preferably 0.1 to 0.5%)

Fe is contained as desired, since it improves a strength. However, if a content thereof is small, a desired effect cannot be obtained, and if the content is extremely large, a giant intermetallic compound during casting is generated and the corrosion resistance deteriorates. For these reasons, in a case where Fe is contained, the Fe content is desirably in the range described above. For the same reasons, a lower limit of the Fe content is desirably 0.1% and an upper limit thereof is desirably 0.5%. Even in a case where Fe is not positively contained, Fe of 0.05% or less may be contained as an inevitable impurity.

[Core material]

An Al—Mn alloy is used as the core material. The following components have been described as suitable, but the present invention is not limited to the following components.

Mn: 0.3% to 2.0% (preferably 0.5 to 2.0%)

Mn is an essential element for improving the strength. However, if the content thereof is small, the desired effect cannot be sufficiently obtained, and if the content thereof is excessively large, manufacturability (castability or rollability) deteriorates. For these reasons, the Mn content is desirably in the range described above. For the same reasons, a lower limit of the Mn content is desirably 0.5% and an upper limit thereof is desirably 2.0%.

Si: 0.05% to 1.0% (preferably 0.1 to 0.8%)

Si is an element for improving the strength and is contained as desired. However, if the Si content is small, the desired effect cannot be obtained, and if the content thereof is excessively large, a melting point is lowered and brazability deteriorates. For these reasons, in a case of containing Si, the Si content is desirably in the range described above. For the same reasons, a lower limit thereof is desirably 0.1% and an upper limit thereof is desirably 0.8%. Even in a case where Si is not positively contained, Si of less than 0.05% may be contained as an inevitable impurity.

Cu: 0.01% to 1.0% (preferably 0.01% to 0.8%)

Cu is an element for improving the strength and is contained as desired. However, if the Cu content is small, a desired effect cannot be obtained, and if the content thereof is extremely large, it causes potential nobility, deterioration in corrosion resistance, and a decrease in melting point. For these reasons, in a case of containing Cu, the Cu content is desirably in the range described above. For the same reasons, a lower limit thereof is desirably 0.01% and an upper limit thereof is desirably 0.8%.

Even in a case where Cu is not positively contained, Cu of less than 0.01% may be contained as an inevitable impurity.

Fe: 0.1% to 0.7% (preferably 0.1 to 0.5%)

Fe is an element for improving the strength and is contained as desired. However, if the Fe content is small, a desired effect cannot be obtained, and if the content thereof is extremely large, a giant intermetallic compound during casting is generated and the corrosion resistance deteriorates. For these reasons, in a case where Fe is contained, the content is desirably in the range described above. For the same reasons, a lower limit thereof is desirably 0.1% and an upper limit thereof is desirably 0.5%. Even in a case where Fe is not positively contained, Fe of 0.05% or less may be contained as an inevitable impurity.

Equivalent circle diameter of Al—Mn based secondary particles: 100 to 400 nm (preferably 150 to 300 nm)

Number density of Al—Mn based secondary particles: 0.3 to $5/\mu m^2$ (preferably 0.4 to $3.5/\mu m^2$)

An equivalent circle diameter and a number density of the Al—Mn based secondary particles have to be controlled in order to satisfy both the corrosion resistance and suppression of erosion. There is a trade-off between the equivalent circle diameter and the number density, and basically, in a case where the equivalent circle diameter is small, the number density increases. In a case where the equivalent circle diameter is small and the number density is extremely large, a recrystallization behavior of the core material during brazing is delayed to cause erosion, which causes brazing defects. In a case where the equivalent circle diameter is large and the number density is low (amount of Si solid solution increases due to re-solid solution), intergranular corrosion occurs due to excess free Si and corrosion resistance deteriorates.

For these reasons, it is desirable that the equivalent circle diameter and the number density of the Al—Mn based secondary particles are in the ranges described above. For the same reasons, it is desirable that a lower limit of the equivalent circle diameter of the Al—Mn based secondary particles is 150 nm and an upper limit thereof is 300 nm, and it is desirable that a lower limit of the number density of the Al—Mn based secondary particles is 0.4 particles/$\mu m^2$ and an upper limit thereof is $3.5/\mu m^2$.

In addition, in order to control a distribution state of these Al—Mn based secondary particles, it is necessary to appropriately combine a homogenization treatment or hot rolling and an annealing temperature condition. In the homogenization treatment, an ingot is preferably heated at a treatment temperature of 400° C. to 600° C. for 5 to 20 hours, thereby controlling the precipitation of the second phase compound. The higher the treatment temperature and the longer the treatment time, the larger the size of the second phase compound and the lower the density. In addition, the same tendency is also shown regarding a hot rolling temperature and a final annealing condition, and accordingly, the finishing temperature of the hot rolling and the final annealing condition are appropriately controlled. The hot rolling finishing temperature is preferably 400° C. to 450° C. and the final annealing temperature is preferably 350° C. or higher. However, the distribution state of the second phase compound also changes depending on the combination of these, and accordingly, it is necessary to appropriately combine and select these process conditions, in order to obtain the second phase compound distribution state in the above range.

[Sacrificial Material/Core Material]

If the content of Si is extremely large with respect to a Mn concentration of the core material (including the content that increases due to diffusion), Si precipitation at the grain boundaries occurs, and if it is extremely small, the precipitation on the grain boundaries of Al—Mn based secondary particles, the formation of the Mn depleted layer on the grain boundaries occur thereby deteriorating the corrosion resistance. However, these can be suppressed and the corrosion resistance can be improved by adjusting the Mn/Si ratio as follows. Incidentally, the Al—Mn based secondary particles or the Mn/Si ratio can be adjusted by the homogenization treatment, the hot rolling, and the annealing temperature.

Mn/Si ratio in region of 50 μm from sacrificial material/core material interface in core material depth direction after brazing: 0.5 to 5.0 (preferably 1.0 to 4.0)

The corrosion resistance can be improved by satisfying the above ratio. If the ratio is extremely small, the intergranular corrosion occurs due to an extremely large amount of free Si, and if the ratio is extremely large, the strength is insufficient. For these reasons, the content ratio is desirably in the range described above. For the same reasons, a lower limit of the content ratio is desirably 1.0% and an upper limit thereof is desirably 4.0%.

Potential difference between most noble layer in sacrificial material and least noble layer in core material: 50 to 200 mV (preferably 80 to 200 mV)

By having the potential difference described above, the corrosion resistance can be improved. If the potential difference is extremely small, the corrosion resistance deteriorates, and if the potential difference is extremely large, a corrosion ratio is accelerated. For these reasons, the potential difference is desirably in the range described above. For the same reasons, a lower limit of the potential difference is desirably 80 mV, and an upper limit of the potential difference is desirably 200 mV.

Advantageous Effects of Invention

As described above, according to the present invention, an aluminum alloy brazing sheet having excellent brazability as a sacrificial material and corrosion resistance can be obtained.

DESCRIPTION OF EMBODIMENTS

Hereinafter, embodiments of the present invention will be described.

An aluminum alloy for a core material and an aluminum alloy for a sacrificial material having a composition of the present invention are prepared. These alloys can be produced by a conventional method, and the production method is not particularly limited. For example, it can be manufactured by semi-continuous casting.

An Al—Mn-based alloy is used as the aluminum alloy for the core material, and an Al—Zn—Si-based alloy is used as the aluminum alloy for the sacrificial material.

For the Al—Mn-based alloy for the core material, an alloy containing a composition of Mn: 0.3% to 2%, Si: 0.05% to 1%, Cu: 0.01% to 1.0%, Fe: 0.1% to 0.7% in terms of mass % and a balance of Al and inevitable impurity can be suitably used. However, in the present invention, the composition of the Al—Mn-based alloy is not limited to the above.

For the aluminum alloy for the sacrificial material, an alloy preferably containing Si: 2.0% to 5.0% and Zn: 3.0% to 5.0%, and if desired, in terms of mass %, one kind or two or more kinds of Mn: 0.1% to 1.0% and Fe: 0.1% to 0.7% can be used.

The aluminum alloy for the core material or the aluminum alloy for the sacrificial material can be subjected to the homogenization treatment, if desired, after being melted. The conditions of the homogenization treatment are not particularly limited, and for example, the core material can be subjected to the homogenization treatment at 400° C. to 600° C. for 4 to 16 hours, and the sacrificial material can be subjected to the homogenization treatment at 400° C. to 500° C. for 4 to 16 hours.

The aluminum alloy for the core material and the aluminum alloy for the sacrificial material is obtained as plate materials through the hot rolling. In addition, these may be obtained as plate materials through continuous casting and rolling.

These plate materials are clad with an appropriate clad ratio in a state where the sacrificial material is disposed on one surface or both surfaces of the core material and to be overlapped. In a case of disposing the sacrificial material on one surface of the core material, a sacrificial material having other compositions may be overlapped on another surface thereof.

The cladding is generally performed by hot rolling. Then, cold rolling is further performed to obtain an aluminum alloy brazing sheet having a desired thickness.

In the present invention, a clad ratio of a clad material is not particularly limited, and for example, 5% to 25% of a sacrificial material thickness, 75% to 95% of a core material thickness, or the like is used.

The clad material is cold-rolled to a thickness of 0.15 to 0.80 mm. In the middle of cold rolling, process annealing may be performed. The conditions for process annealing can be selected from a range of 200° C. to 380° C. and 1 to 6 hours.

After the cold rolling, final annealing can be performed. The final annealing is performed under the conditions at 400° C. for 4 hours, for example.

The obtained clad material can be used, for example, as a tube material for a heat exchanger.

The tube material for the heat exchanger is brazed and joined to an appropriate brazing member such as an inner fin.

A material, a shape, and the like of the brazing member are not particularly limited in this invention, and aluminum material can be suitably used.

As a result of the brazing, a heat exchanger tube is obtained.

The heat treatment conditions at the time of brazing are not particularly limited, except that the temperature is raised to 590° C. to 615° C. For example, the heat treatment can be performed under the conditions in which the heating is performed at a temperature increase rate such that the time to reach a target temperature from 550° C. is 1 to 10 minutes, the temperature is maintained at the target temperature of 590° C. to 615° C. for 1 minute to 20 minutes, then, cooling is performed to 300° C. at 50 to 100° C./min, and then air cooling is performed to room temperature.

Example 1

Aluminum alloys for the sacrificial material and the core material were cast by semi-continuous casting. The alloys shown in examples (balance of Al and inevitable impurity) were used as the aluminum alloys for the sacrificial material and the core material. Each alloy was subjected to the homogenization treatment for 10 hours under temperature conditions shown in the examples.

Next, the hot rolling was performed under predetermined conditions, and cold rolling was further performed to obtain a plate thickness of 0.5 mm. After that, the annealing was carried out for 3 hours under the temperature conditions described in the examples to prepare a plate material having temper O.

Manufacturing Process

Homogenization Treatment

After slab casting, the homogenization treatment is performed for the purpose of removing inhomogeneous structures such as segregation.

Due to the high-temperature homogenization treatment, an additive element supersaturated and solid-solved in a matrix is precipitated as an intermetallic compound during casting. Since a size or a distribution amount of the precipitated intermetallic compound is affected by the temperature and time of the homogenization treatment, it is necessary to select the heat treatment conditions according to the type of the additive element.

Hot Rolling Finishing Temperature

Normally, the hot rolling is loaded at a high temperature of approximately 500° C., but after the rolling is completed, it is coiled and cooled to room temperature. In this case, a holding time at a high temperature changes depending on the finishing temperature of hot rolling, and accordingly, it affects the precipitation behavior of the intermetallic compound.

Brazing Process

The heat treatment equivalent to brazing was performed by a method for increasing the temperature from room temperature to 590° C. to 615° C. in approximately 20 minutes, holding the temperature at 590° C. to 615° C. for 3 to 20 minutes, and then controlling the cooling from 590° C. to 615° C. to 300° C. at a cooling rate of 100° C./min Evaluation Method Distribution State of Dispersoids The equivalent circle diameter and the number density (particles/µm$^2$) of the dispersoids were measured by a scanning electron microscope (FE-SEM).

In the measurement method, a cross section of the plate material (parallel cross section in a rolling direction) was exposed to a sample material before brazing heat treatment by mechanical polishing and cross section polisher (CP) processing to manufacture a sample, and images were captured with FE-SEM at 10,000 to 50,000 times. The images were captured at 10 fields of view, and the equivalent circle diameter and the number density of the dispersoids were measured by image analysis.

Pitting Potential Measurement

The pitting potential was measured by anodic polarization measurement. A saturated calomel electrode (SCE) was used as a reference electrode, and an electrolyte was measured under the conditions of a 2.67% AlCl$_3$ solution at 40° C., which was sufficiently degassed by blowing high-purity N$_2$ gas, and a sweep rate was 0.5 mV/s.

The potential measurement of the eutectic filler of sacrificial material, the sacrificial material/core material interface layer, and the core material was performed after etching and removing a sample after a brazing heat treatment from an outermost surface of the sacrificial material with 5% NaOH (caustic soda) to obtain a predetermined plate thickness. The potential measurement of the primary filler of sacrificial material was performed after the eutectic filler of sacrificial material having the lowest potential was completely eliminated by anodic dissolution.

Element Diffusion State and Mn/Si Ratio after Brazing

The Zn, Cu, Fe, and Si concentrations in a plate thickness direction of the sample after brazing were measured by EPMA ray analysis. The Mn concentration was measured for each layer by EPMA semi-quantitative analysis. Since Mn has an extremely slow diffusion rate with respect to an Al matrix and shows a substantially constant concentration in each layer regardless of the plate thickness direction, it was measured at an arbitrary position in the plate thickness direction. In the line analysis, only the count number was analyzed, but it was determined whether the diffusion state in each layer was uniform. As a result, the Mn/Si ratio in region of 50 µm from sacrificial material/core material interface in core material depth direction was calculated. The concentration ratio is calculated in terms of % by weight.

The Mn/Si ratio after brazing greatly depends on, not only the alloy component, but also the heat treatment conditions. Generally, when heat treatment is performed at a high temperature, the precipitation and growth of dispersoids are promoted, and the solid solubility of Mn and Si decreases. It is necessary to control the Mn/Si ratio by appropriately combining the homogenization treatment, the hot rolling, and the annealing temperature conditions.

OY Water Immersion Corrosion Test

An immersion test with OY water (Cl—: 195 ppm, SO4$^{2-}$: 60 ppm, Cu$^{2+}$: 1 ppm, Fe$^{3+}$: 30 ppm, and balance of pure water) was carried out. In test conditions, room temperature×16 h+88° C.×8 h (without stirring) was defined as a daily cycle, and evaluation was performed up to 12 weeks. A corrosion depth was measured and the presence or absence of intergranular corrosion was confirmed. The evaluation results are shown by A, B, C, and D in the corrosion resistance evaluation in Table 1.

[Evaluation Criteria]

D: Significant intergranular corrosion occurred, C: Both intergranular corrosion and transgranular corrosion occur, B: Intergranular corrosion (minor) and transgranular corrosion occurs, A: Only transgranular corrosion Regarding the corrosion resistance, although the intergranular corrosion does not occur, if through holes are generated in the OY water immersion corrosion test for 12 weeks, it is evaluated as D.

Inverted T-Shaped Fluidity Test

In order to evaluate the brazability, an inverted T-shaped test was performed using a sample material having an upper surface as the sacrificial material for a horizontal material and using an A3003 alloy for a vertical material. The evaluation results are indicated by A and B based on the brazability evaluation in Table 1.

[Evaluation Criteria]

A: No unjoined parts, B: There are unjoined parts. In addition, a material in which the erosion of 150 µm or more from the sacrificial material/core material interface in the core material direction was also evaluated as B.

TABLE 1

| Sample material No. | Alloy composition of sacrificial material (mass %) | | | | Alloy composition of core material (mass %) | | | | Condition for core material homogenization treatment | Finishing temperature of hot rolling | Final annealing temperature |
|---|---|---|---|---|---|---|---|---|---|---|---|
| | Si | Zn | Mn | Fe | Mn | Si | Cu | Fe | | | |
| Example 1 | 2.02 | 4.02 | 0.01 | 0.02 | 1.12 | 0.01 | 0.49 | 0.38 | 450° C., 10 h | 433° C. | 360° C. |
| 2 | 4.88 | 4.02 | 0.02 | 0.03 | 1.13 | 0.51 | 0.50 | 0.40 | 450° C., 10 h | 430° C. | 362° C. |
| 3 | 3.52 | 3.11 | 0.01 | 0.02 | 1.15 | 0.50 | 0.01 | 0.40 | 450° C., 10 h | 440° C. | 362° C. |
| 4 | 3.52 | 4.90 | 0.01 | 0.01 | 1.15 | 0.50 | 0.50 | 0.37 | 450° C., 10 h | 428° C. | 365° C. |

TABLE 1-continued

|  | | | | | | | | | | | |
|---|---|---|---|---|---|---|---|---|---|---|---|
| | 5 | 3.55 | 4.02 | 0.14 | 0.01 | 1.12 | 0.48 | 0.51 | 0.40 | 580° C., 10 h | 440° C. | 440° C. |
| | 6 | 3.54 | 3.99 | 0.95 | 0.30 | 1.15 | 0.50 | 0.50 | 0.33 | 450° C., 10 h | 450° C. | 436° C. |
| | 7 | 3.50 | 3.58 | 0.52 | 0.15 | 1.16 | 0.50 | 0.51 | 0.40 | 400° C., 10 h | 351° C. | 402° C. |
| | 8 | 3.54 | 3.44 | 0.52 | 0.66 | 1.15 | 0.47 | 0.50 | 0.41 | 450° C., 10 h | 429° C. | 500° C. |
| | 9 | 3.51 | 3.40 | 0.51 | 0.44 | 0.35 | 0.50 | 0.52 | 0.03 | 450° C., 10 h | 430° C. | 430° C. |
| | 10 | 3.50 | 3.62 | 0.52 | 0.40 | 1.90 | 0.50 | 0.50 | 0.40 | 450° C., 10 h | 420° C. | 420° C. |
| | 11 | 3.49 | 3.49 | 0.51 | 0.41 | 1.15 | 0.10 | 0.51 | 0.41 | 500° C., 10 h | 440° C. | 415° C. |
| | 12 | 4.02 | 3.98 | 0.50 | 0.43 | 1.17 | 0.95 | 0.50 | 0.43 | 450° C., 10 h | 408° C. | 408° C. |
| | 13 | 4.02 | 4.00 | 0.53 | 0.44 | 1.15 | 0.50 | 0.10 | 0.39 | 450° C., 10 h | 430° C. | 430° C. |
| | 14 | 4.11 | 3.99 | 0.48 | 0.42 | 1.18 | 0.48 | 0.95 | 0.40 | 450° C., 10 h | 380° C. | 360° C. |
| | 15 | 4.10 | 4.02 | 0.53 | 0.44 | 0.25 | 0.50 | 0.50 | 0.13 | 450° C., 10 h | 422° C. | 422° C. |
| | 16 | 3.98 | 3.97 | 0.50 | 0.41 | 1.14 | 0.47 | 0.51 | 0.68 | 450° C., 10 h | 408° C. | 408° C. |
| | 17 | 3.50 | 3.21 | 0.01 | 0.01 | 1.15 | 0.11 | 1.05 | 0.42 | 450° C., 10 h | 425° C. | 362° C. |
| | 18 | 3.51 | 3.82 | 0.01 | 0.02 | 1.80 | 0.80 | 0.55 | 0.81 | 450° C., 10 h | 428° C. | 358° C. |
| | 19 | 3.55 | 3.85 | 0.02 | 0.01 | 1.15 | 1.12 | 0.47 | 0.39 | 450° C., 10 h | 420° C. | 361° C. |
| | 20 | 3.40 | 3.88 | 0.01 | 0.01 | 0.20 | 0.40 | 0.50 | 0.40 | 450° C., 10 h | 428° C. | 361° C. |
| | 21 | 4.52 | 3.12 | 1.10 | 0.01 | 1.12 | 0.51 | 0.52 | 0.41 | 580° C., 10 h | 433° C. | 365° C. |
| | 22 | 3.55 | 3.85 | 0.02 | 0.01 | 0.33 | 0.48 | 0.50 | 0.39 | 380° C., 20 h | 430° C. | 358° C. |
| | 23 | 2.12 | 3.90 | 0.01 | 0.02 | 1.20 | 0.15 | 0.47 | 0.41 | 620° C., 8 h | 431° C. | 360° C. |
| Comparative | 24 | 1.89 | 4.02 | 0.01 | 0.01 | 1.15 | 0.50 | 0.50 | 0.40 | 450° C., 10 h | 422° C. | 362° C. |
| example | 25 | 5.22 | 4.02 | 0.02 | 0.02 | 1.15 | 0.48 | 0.50 | 0.35 | 450° C., 10 h | 425° C. | 364° C. |
| | 26 | 3.52 | 2.85 | 0.03 | 0.03 | 1.15 | 0.50 | 0.49 | 0.38 | 450° C., 10 h | 415° C. | 362° C. |
| | 27 | 3.52 | 5.12 | 0.01 | 0.02 | 0.50 | 0.10 | 0.10 | 0.40 | 450° C., 10 h | 430° C. | 360° C. |
| | 28 | 3.20 | 3.95 | 0.01 | 0.02 | 1.15 | 0.50 | 0.50 | 0.41 | 580° C., 10 h | 438° C. | 480° C. |
| | 29 | 3.52 | 3.90 | 0.51 | 0.81 | 1.15 | 0.49 | 0.48 | 0.40 | 580° C., 10 h | 450° C. | 451° C. |
| | 30 | 3.50 | 3.70 | 0.44 | 0.17 | 1.14 | 0.48 | 0.49 | 0.38 | 400° C., 10 h | 352° C. | 300° C. |

| | Sample material No. | Number density of Al—Mn based secondary particles in core material before brazing (particles/μm$^2$) | Mn/Si ratio in region immediately below sacrificial material/interface after brazing | Potential difference of most noble layer in sacrificial material and least noble layer in core material after brazing (mV) | Evaluation of brazability | Evaluation of corrosion resistance |
|---|---|---|---|---|---|---|
| Example | 1 | 1.4 | 4.6 | 180 | A | B |
| | 2 | 1.4 | 1.2 | 60 | A | B |
| | 3 | 1.5 | 1.8 | 100 | A | B |
| | 4 | 1.5 | 1.9 | 190 | A | B |
| | 5 | 0.3 | 1.9 | 155 | A | B |
| | 6 | 1.0 | 1.8 | 100 | A | A |
| | 7 | 3.5 | 1.9 | 110 | A | A |
| | 8 | 0.7 | 1.9 | 110 | A | A |
| | 9 | 0.6 | 0.6 | 40 | A | B |
| | 10 | 4.8 | 3.3 | 120 | A | A |
| | 11 | 0.9 | 3.0 | 130 | A | A |
| | 12 | 1.6 | 0.7 | 100 | A | A |
| | 13 | 1.5 | 1.8 | 160 | A | A |
| | 14 | 4.0 | 1.6 | 185 | A | B |
| | 15 | 0.3 | 0.5 | 70 | A | B |
| | 16 | 1.5 | 1.8 | 120 | A | A |
| | 17 | 1.4 | 1.6 | 150 | A | C |
| | 18 | 2.0 | 1.3 | 110 | A | C |
| | 19 | 2.2 | 1.0 | 80 | A | C |
| | 20 | 0.3 | 0.3 | 110 | A | C |
| | 21 | 1.0 | 1.3 | 45 | A | C |
| | 22 | 0.8 | 0.4 | 70 | A | C |
| | 23 | 1.0 | 5.1 | 210 | A | C |
| Comparative | 24 | 1.4 | 4.6 | 160 | B | B |
| example | 25 | 1.4 | 1.2 | 40 | B | D |
| | 26 | 1.5 | 1.9 | 45 | A | D |
| | 27 | 1.4 | 1.0 | 210 | A | D |
| | 28 | 0.2 | 1.9 | 160 | A | D |
| | 29 | 0.2 | 1.8 | 130 | A | D |
| | 30 | 5.2 | 1.8 | 110 | B | B |

The invention claimed is:

1. An aluminum alloy brazing sheet, comprising:
a sacrificial material having a function of a brazing material on at least one surface of a core material,
wherein the sacrificial material has a composition comprising, in mass %:
2.0% to 5.0% of Si;
3.0% to 5.0% of Zn; and
Al,
wherein the core material comprises an Al—Mn-based alloy, and
in the core material before brazing, Al—Mn-based secondary particles having an equivalent circle diameter of 150 to 400 nm are distributed with a number density of 0.3 to 5 particles/$\mu m^2$.

2. The sheet of claim 1, wherein when the sheet is subjected to a heat treatment equivalent to brazing in which a temperature is raised from 590° C. to 615° C., a Mn/Si ratio is 0.5 to 5.0 in a region of 50 μm from the sacrificial material/core material interface.

3. The sheet of claim 1, wherein the core material comprises, in mass %:
0.3% to 2.0% of Mn;
0.05% to 1.0% of Si;
0.01% to 1.0% of Cu; and
0.1% to 0.7% of Fe.

4. The sheet of claim 1, wherein the sacrificial material further comprises, in mass %:
0.1% to 1.0% of Mn; and/or
0.1% to 0.7% of Fe.

5. The sheet of claim 1, wherein when the sheet is subjected to a heat treatment equivalent to brazing in which a temperature is raised from 590° C. to 615° C., an eutectic filler and a primary filler are formed in the sacrificial material,
wherein after the heat treatment, a pitting potential is less noble in an order of
the eutectic filler,
the primary filler, and
the sacrificial material/core material interface, and
wherein after the heat treatment, a potential difference between a most noble layer in the sacrificial material and a least noble layer in the core material is 50 to 200 mV.

6. The sheet of claim 2, wherein the core material comprises, in mass %:
0.3% to 2.0% of Mn;
0.05% to 1.0% of Si;
0.01% to 1.0% of Cu; and
0.1% to 0.7% of Fe.

7. The sheet of claim 2, wherein the sacrificial material further comprises, in mass %:
0.1% to 1.0% of Mn; and/or
0.1% to 0.7% of Fe.

8. The sheet of claim 3, wherein the sacrificial material further comprises, in mass %:
0.1% to 1.0% of Mn; and/or
0.1% to 0.7% of Fe.

9. The sheet of claim 6, wherein the sacrificial material further comprises, in mass %:
0.1% to 1.0% of Mn; and/or
0.1% to 0.7% of Fe.

10. The sheet of claim 2, wherein when the sheet is subjected to a heat treatment equivalent to brazing in which a temperature is raised from 590° C. to 615° C., an eutectic filler and a primary filler are formed in the sacrificial material,
wherein after the heat treatment, a pitting potential is less noble in an order of
the eutectic filler,
the primary filler, and
the sacrificial material/core material interface, and
wherein after the heat treatment, a potential difference between a most noble layer in the sacrificial material and a least noble layer in the core material is 50 to 200 mV.

11. The sheet of claim 3, wherein when the sheet is subjected to a heat treatment equivalent to brazing in which a temperature is raised from 590° C. to 615° C., an eutectic filler and a primary filler are formed in the sacrificial material,
wherein after the heat treatment, a pitting potential is less noble in an order of
the eutectic filler,
the primary filler, and
the sacrificial material/core material interface, and
wherein after the heat treatment, a potential difference between a most noble layer in the sacrificial material and a least noble layer in the core material is 50 to 200 mV.

12. The sheet of claim 4, wherein when the sheet is subjected to a heat treatment equivalent to brazing in which a temperature is raised from 590° C. to 615° C., an eutectic filler and a primary filler are formed in the sacrificial material,
wherein after the heat treatment, a pitting potential is less noble in an order of
the eutectic filler,
the primary filler, and
the sacrificial material/core material interface, and
wherein after the heat treatment, a potential difference between a most noble layer in the sacrificial material and a least noble layer in the core material is 50 to 200 mV.

13. The sheet of claim 6, wherein when the sheet is subjected to a heat treatment equivalent to brazing in which a temperature is raised from 590° C. to 615° C., an eutectic filler and a primary filler are formed in the sacrificial material,
wherein after the heat treatment, a pitting potential is less noble in an order of
the eutectic filler,
the primary filler, and
the sacrificial material/core material interface, and
wherein after the heat treatment, a potential difference between a most noble layer in the sacrificial material and a least noble layer in the core material is 50 to 200 mV.

14. The sheet of claim 7, wherein when the sheet is subjected to a heat treatment equivalent to brazing in which a temperature is raised from 590° C. to 615° C., an eutectic filler and a primary filler are formed in the sacrificial material,
wherein after the heat treatment, a pitting potential is less noble in an order of
the eutectic filler,
the primary filler, and
the sacrificial material/core material interface, and
wherein after the heat treatment, a potential difference between a most noble layer in the sacrificial material and a least noble layer in the core material is 50 to 200 mV.

15. The sheet of claim 8, wherein when the sheet is subjected to a heat treatment equivalent to brazing in which a temperature is raised from 590° C. to 615° C., an eutectic filler and a primary filler are formed in the sacrificial material, wherein after the heat treatment, a pitting potential is less noble in an order of the eutectic filler, the primary filler, and the sacrificial material/core material interface, and wherein after the heat treatment, a potential difference between a most noble layer in the sacrificial material and a least noble layer in the core material is 50 to 200 mV.

16. The sheet of claim 9, wherein when the sheet is subjected to a heat treatment equivalent to brazing in which a temperature is raised from 590° C. to 615° C., an eutectic filler and a primary filler are formed in the sacrificial material, wherein after the heat treatment, a pitting potential is less noble in an order of the eutectic filler, the primary filler, and the sacrificial material/core material interface, and wherein after the heat treatment, a potential difference between a most noble layer in the sacrificial material and a least noble layer in the core material is 50 to 200 mV.

17. The sheet of claim 1, wherein the sacrificial material comprises 2.5 mass % to 5.0 mass % of Si.

18. The sheet of claim 1, wherein the sacrificial material comprises the Al, the Si, and the Zn, inevitable impurities, and optionally Mn in a range of from 0.1 to 1.0 mass % and/or Fe in a range of from 0.1 to 0.7 mass %.

19. The sheet of claim 1, wherein the sacrificial material comprises 2.0 mass % to 4.0 mass % of Si.

20. The sheet of claim 1, wherein when an inverted T-shaped test is performed using the sheet having an upper surface as the sacrificial material for a horizontal material and using an A3003 alloy for a vertical material, unjoined parts are not formed and erosion of 150 µm or more from the sacrificial material/core material interface in the core material direction does not occur.

* * * * *